US007817303B2

(12) United States Patent
Kato et al.

(10) Patent No.: US 7,817,303 B2
(45) Date of Patent: Oct. 19, 2010

(54) IMAGE PROCESSING AND IMAGE FORMING WITH MODIFICATION OF A PARTICULAR CLASS OF COLORS

(75) Inventors: Minako Kato, Kawasaki (JP); Shigeyasu Nagoshi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 755 days.

(21) Appl. No.: 11/246,300

(22) Filed: Oct. 11, 2005

(65) Prior Publication Data

US 2006/0075918 A1 Apr. 13, 2006

(30) Foreign Application Priority Data

Oct. 12, 2004 (JP) ............................ 2004-297899

(51) Int. Cl.
*H04N 1/60* (2006.01)

(52) U.S. Cl. ........................ 358/1.9; 358/515; 358/518; 358/520; 358/448; 358/453; 348/713; 348/255; 382/162; 382/164; 382/165; 382/167; 382/199; 382/254; 382/274; 382/286

(58) Field of Classification Search .................. 358/1.9, 358/515, 518, 520, 448, 453; 348/713, 255; 382/162, 164, 165, 167, 199, 254, 274, 286
See application file for complete search history.

(56) References Cited

U.S. PATENT DOCUMENTS 5,313,277 A * 5/1994 Suzuki .................... 348/223.1
5,781,315 A * 7/1998 Yamaguchi ................. 358/520
5,844,688 A * 12/1998 Shimizu et al. ............. 358/296
5,875,265 A * 2/1999 Kasao ........................ 382/229
5,877,772 A * 3/1999 Nomura et al. ............. 345/594

(Continued)

FOREIGN PATENT DOCUMENTS

JP 2001-292333 A 10/2001

(Continued)

OTHER PUBLICATIONS

K. Xiao, M.R. Luo, J. Li, P.A. Rhodes and C.Taylor: “Specifying the Colour Appearance of a Real Room”, Eleventh Color Imaging Conference, Color Science and Engineering Systems, Technologies, Applications, Nov. 3, 2003, pp. 308-312, XP002293731 Scottsdale, Arizona.*

(Continued)

*Primary Examiner*—King Y Poon
*Assistant Examiner*—David S Cammack
(74) *Attorney, Agent, or Firm*—Fitzpatrick, Cella, Harper & Scinto

(57) ABSTRACT

This invention provides an image processing device and a printing apparatus that obviate the need for manual processing on the part of the user or operator and which can automatically perform an optimum image correction without using added information such as photographing information. For this purpose, this invention including: a highly chromatic color area detection unit to detect highly chromatic color area in an original image according to the input color image data; a concentration calculation unit to calculate a concentration level of the highly chromatic color area; and a print data generation unit to generate output color image data according to the concentration level of the highly chromatic color area.

7 Claims, 8 Drawing Sheets

U.S. PATENT DOCUMENTS

| | | | | |
|---|---|---|---|---|
| 6,118,552 | A * | 9/2000 | Suzuki et al. | 382/166 |
| 6,473,198 | B1 * | 10/2002 | Matama | 358/1.9 |
| 6,816,613 | B2 | 11/2004 | Tohyama et al. | 382/167 |
| 6,896,347 | B2 | 5/2005 | Kato | 347/15 |
| 6,980,326 | B2 | 12/2005 | Tsuchiya et al. | 358/1.9 |
| 2002/0154326 | A1 | 10/2002 | Tsuchiya et al. | 358/1.9 |
| 2003/0067617 | A1 | 4/2003 | Kato et al. | 358/1.9 |
| 2003/0090709 | A1 * | 5/2003 | Rijavec | 358/1.15 |
| 2003/0164983 | A1 | 9/2003 | Yamada et al. | 358/3.06 |
| 2003/0197709 | A1 * | 10/2003 | Shimazaki et al. | 345/590 |
| 2004/0109181 | A1 * | 6/2004 | Suzuki | 358/1.9 |
| 2005/0169531 | A1 * | 8/2005 | Fan | 382/199 |
| 2005/0179919 | A1 | 8/2005 | Kato | 358/1.9 |
| 2006/0061785 | A1 | 3/2006 | Nagoshi et al. | 358/1.9 |

FOREIGN PATENT DOCUMENTS

| | | | |
|---|---|---|---|
| JP | 2001-339602 | | 12/2001 |
| JP | 2003-134354 | A | 5/2003 |
| JP | 2003134354 | A * | 5/2003 |
| JP | 6-121159 | A | 4/2004 |

OTHER PUBLICATIONS

Office Action dated Jul. 17, 2009 in JP 2004-297899.

* cited by examiner

IMAGE PROCESSING AND IMAGE FORMING WITH MODIFICATION OF A PARTICULAR CLASS OF COLORS

BACKGROUND OF THE INVENTION

1. Field of the Invention

The present invention relates to an image processing device and an image processing method. More specifically, the present invention relates to an image processing method and an image processing device to perform correction processing on image data such as digital picture images.

2. Description of the Related Art

As printers and digital cameras become more sophisticated in performance and available at lower cost in recent years, the printing of digital pictures is gaining popularity among general users. In response to this background, it is widely practiced to correct original images using many application programs and printer driver's functions to allow them to be printed to the users' preference.

A major image correction method currently available involves raising an overall lightness and chroma to make an image look more vivid and crisp. It is also a well known method to detect gamuts of so-called "memory colors" such as colors of skin, grass and sky and to render only the memory colors more vivid or correct them into more preferred colors. These methods can be performed in a variety of ways: the user or operator manually executes the methods; an image is analyzed to execute the methods automatically; the user specifies a mode for their execution; or additional information such as photographing information is analyzed for their automatic execution.

Japanese Patent Application Laid-Open No. 06-121159 discloses a technique that detects memory colors and decides, based on the amount of the memory colors occupying an image, whether or not to correct the memory colors.

Japanese Patent Application Laid-Open No. 2001-292333 discloses a technique which corrects foreground colors according to background colors, by taking advantage of the characteristics of human visual perception in which the colors of foreground changes according the background images.

Japanese Patent Application Laid-Open No. 2003-134354 discloses a technique which determines the number of pixels having a chroma higher than a predetermined level and, for those images with a greater number of such pixels than a predetermined value, corrects a tone of portions having a high chroma.

However, with these techniques disclosed in the above patent documents, there are cases where images which look preferable to human perceptions can not be obtained even after they have undergone the above correction processing.

As one cause for this problem, the inventors of this invention have found that the human preference for "showiness" of colors changes according to concentrations of highly chromatic color areas in an image. Here, quantities associated with the "showiness" or include chroma, lightness, contrast and hue. When highly chromatic color areas are concentrated, they look too heavy or too showy to human eye. Thus, the "showiness" should be kept low. Conversely, where the highly chromatic color areas are dispersed, they look vibrant and vivid in the image if their level of showiness is enhanced.

With the techniques disclosed in the above patent documents, however, since the concentration of highly chromatic color areas is not detected, the "showiness" is not properly corrected. It is therefore not possible to form images that look most preferable to human perception.

SUMMARY OF THE INVENTION

The present invention has been accomplished to solve the above problems and provide an image processing device and a printing apparatus that obviate the need for manual processing on the part of the user or operator and which can automatically perform an optimum image correction without using added information such as photographing information.

To achieve the above objective, this invention has the following construction.

That is, according to a first aspect, this invention provides an image processing device comprising: highly chromatic color area detection means for detecting highly chromatic color area in an original image according to the input color image data; concentration calculation means for calculating a concentration level of the highly chromatic color area; and output image data generation means for generating output color image data according to the concentration level of the highly chromatic color area.

In the first aspect, the output image data generation means may be contemplated to correct an image processing parameter according to the concentration level of the highly chromatic color area, the image processing parameter being adapted to generate output color image data.

In the first aspect, the output image data generation means may be contemplated to correct the input color image data according to the concentration level of the highly chromatic color area.

According to a second aspect, this invention provides an image processing method comprising: a highly chromatic color area detection step to detect highly chromatic color area in the color image data; a concentration calculation step to calculate a concentration level of the highly chromatic color area; and an image data generation step to generate output color image data according to the concentration level of the highly chromatic color area.

According to a third aspect, this invention provides an image forming system having image processing means for performing image processing to input color image data, and image forming means for forming an image based on an output image signal generated by the image processing means, the image forming system comprising: highly chromatic color area detection means for detecting highly chromatic color area in the color image data; concentration calculation means for calculating a concentration level of the highly chromatic color area; and image data generation means for generating output color image data according to the concentration level of the highly chromatic color area.

According to a fourth aspect, this invention provides an image processing program causing a computer to execute: a highly chromatic color area detection step to detect highly chromatic color area in an original image based on the input color image data; a concentration calculation step to calculate a concentration level of the highly chromatic color area; and an output image data generation step to generate output color image data according to the concentration level of the highly chromatic color area.

According to a fifth aspect, this invention provides a computer-readable storage medium storing an image processing program to perform image processing to input color image data, the storage medium causing a computer to execute: a highly chromatic color area detection step to detect highly chromatic color area in an original image based on the input color image data; a concentration calculation step to calculate a concentration level of the highly chromatic color area; and an output image data generation step to generate output color image data according to the concentration level of the highly chromatic color area.

With this invention it is possible to easily and automatically produce image data to form an image that gives a preferable impression, without requiring additional information on the image or manual processing on the part of the user.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Now, embodiments of this invention will be described by referring to the accompanying drawings.

First Embodiment

Figure 1:
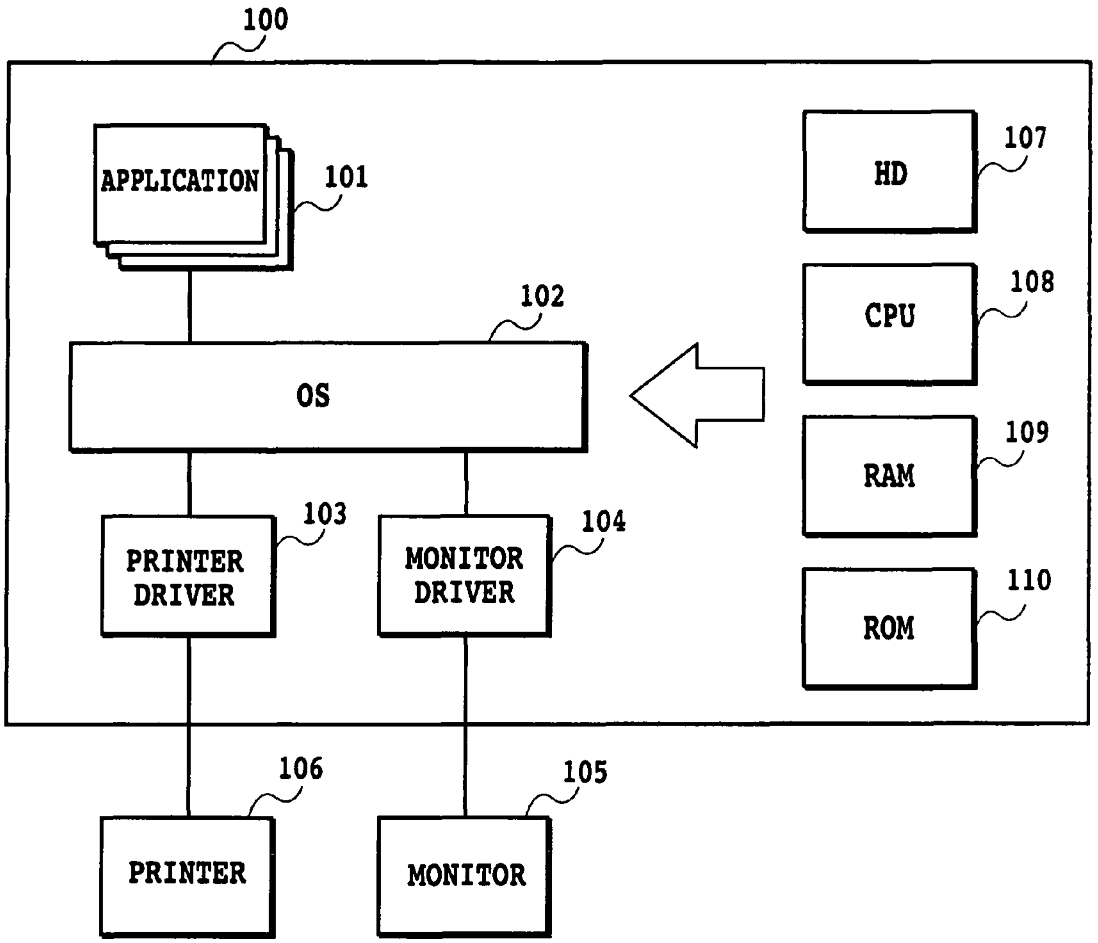
FIG. 1 is a block diagram showing a configuration of a print system applicable to a first embodiment of this invention.

FIG. 1 is a block diagram showing an outline configuration of an image forming system in one embodiment of this invention.

The image forming system includes a host computer 100 with a function of an image processing means, a printer 106 as an image forming means, and a monitor 105. That is, the host computer 100 is connected with the printer 106 of an ink jet printing system and the monitor 105 in a way that allows them to communicate in both directions.

The host computer 100 has an operating system (OS) 102. The host computer 100 also has, as software under the management of the OS 102, applications 101 such as word processor, spreadsheet, image processor and Internet browser. Further, the host computer 100 has a printer driver 103 that processes a variety of writing instructions issued by the application and representing an output image and generates print data. The variety of writing instructions include image writing instructions, text writing instructions and graphics writing instructions. The host computer 100 have a monitor driver 104 that processes the writing instructions issued by the application 101 and displays processed results on the monitor 105.

The host computer 100 also includes, as hardware operated by the above software, a CPU 108, a hard disk (HD) 107 driven by a hard disk driver, a random access memory (RAM) 109, and a read only memory (ROM) 110.

The hard disk 107 and ROM 110 store various software described above. According to the software read from the hard disk 107 and ROM 110 as required, the CPU 108 processes signals. The RAM 109 is used as a work area during the signal processing by the CPU 108.

With the image forming system of the above configuration, the user watching an image displayed on the monitor 105 performs image processing by the application 101. This processing generates image data, including text data such as characters classified as text, graphics data such as figures classified as graphics, and image data such as landscape images classified as image.

When a request is made by the user to produce a printed output of the generated image data, the application 101 requests the OS 102 to produce a printout. Further, the application 101 issues to the OS 102 a group of writing instructions, which is made up of graphics writing instructions for a graphics data portion and image writing instructions for an image data portion. Upon receiving the printout demand from the application, the OS 102 now issues the writing instructions to the printer driver 103 corresponding the printer that performs the printing.

The printer driver 103 processes the print request and the writing instructions received from the OS 102, generates print data printable by the printer 106 and transfers the print data to the printer 106. If the printer 106 is a raster printer, the printer driver 103 performs image correction processing successively in accordance with the writing instructions from the OS 102 and rasterizes the image data in a RGB 24-bit page memory. With all writing instructions rasterized, the content of the RGB 24-bit page memory is converted into a data format printable by the printer 106, such as CMYK data. The converted CMYK data is then transferred to the printer.

Figure 2:
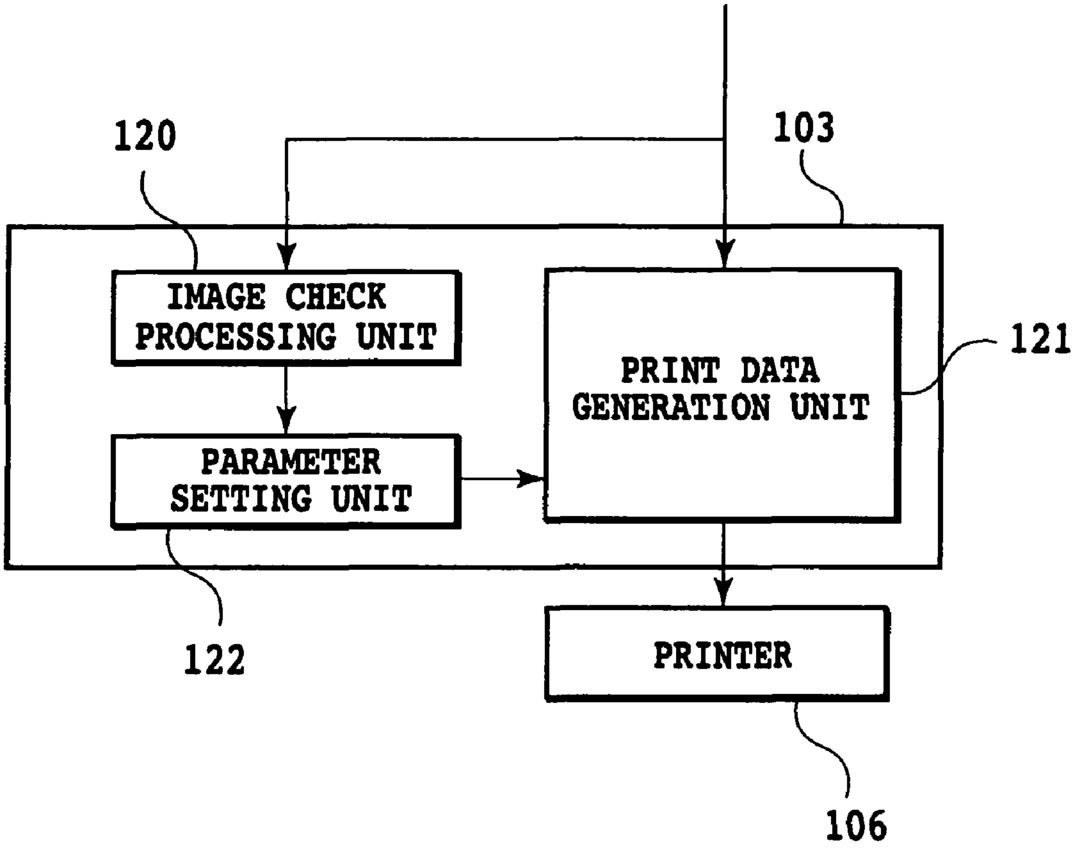
FIG. 2 is a block diagram showing a printer driver configuration in the print system of FIG. 1.

FIG. 2 shows processing performed by the printer driver 103. The processing performed by the printer driver 103 consists largely of image check processing and print data generation processing.

An image check processing unit 120 performs an image check on color information (input image data) made up of RGB luminance signals contained in the writing instructions entered from the OS 102. Based on the check result, a parameter setting unit 122 sets image processing parameters (hereinafter referred to as "color processing parameters") used in generating print image data.

On the other hand, a print data generation unit 121 rasterizes the writing instructions on the color information received. Then, based on the color processing parameters set by the parameter setting unit 122, the print data generation unit 121 generates a raster image in the RGB 24-bit page memory. Further, the print data generation unit 121 generates image data that depends on the color reproducibility of the printer for each pixel, i.e., cyan (C), magenta (M), yellow (Y) and black (K) image data. The generated image data is transferred to the printer 106.

Next, the image check processing unit 120 will be explained.

Figure 3:
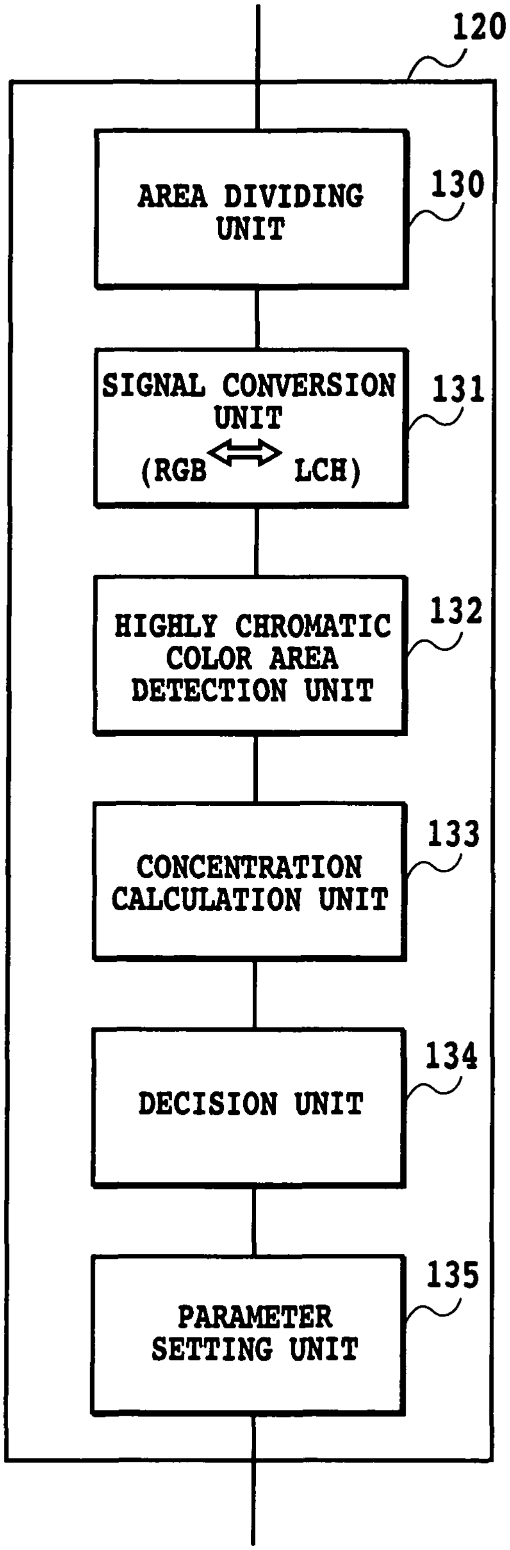
FIG. 3 is a block diagram showing a functional configuration of an image check processing unit.

FIG. 3 is a block diagram showing a functional configuration of the image check processing unit 120.

The image check processing unit 120 shown here has an area dividing processing unit 130 to divide an image into pixel groups described later and a signal conversion processing unit 131 to perform conversion between RGB luminance signals and lightness, color and chroma (LCH) signals. The image check processing unit 120 also includes a highly chromatic color area detection unit 132 to detect highly chromatic color areas in the image. The image check processing unit 120 includes a concentration calculation unit 133 to calculate a degree of concentration of highly chromatic areas in the image. The image check processing unit 120 includes a decision unit 134 to decide, based on the result of calculation by the concentration calculation unit 133, whether or not the concentration is higher than a predetermined level. The image check processing unit 120 also has a parameter setting unit 135 that sets the following image processing parameters based on the result of the decision made by the decision unit 134.

The parameter setting unit 135 can selectively set one of two color processing parameters, a color processing parameter 1 for printing at normal lightness and chroma and a color processing parameter 2 for printing at higher lightness and chroma. Of these two parameters, the color processing parameter 2 is used to print showy images.

Figure 4:
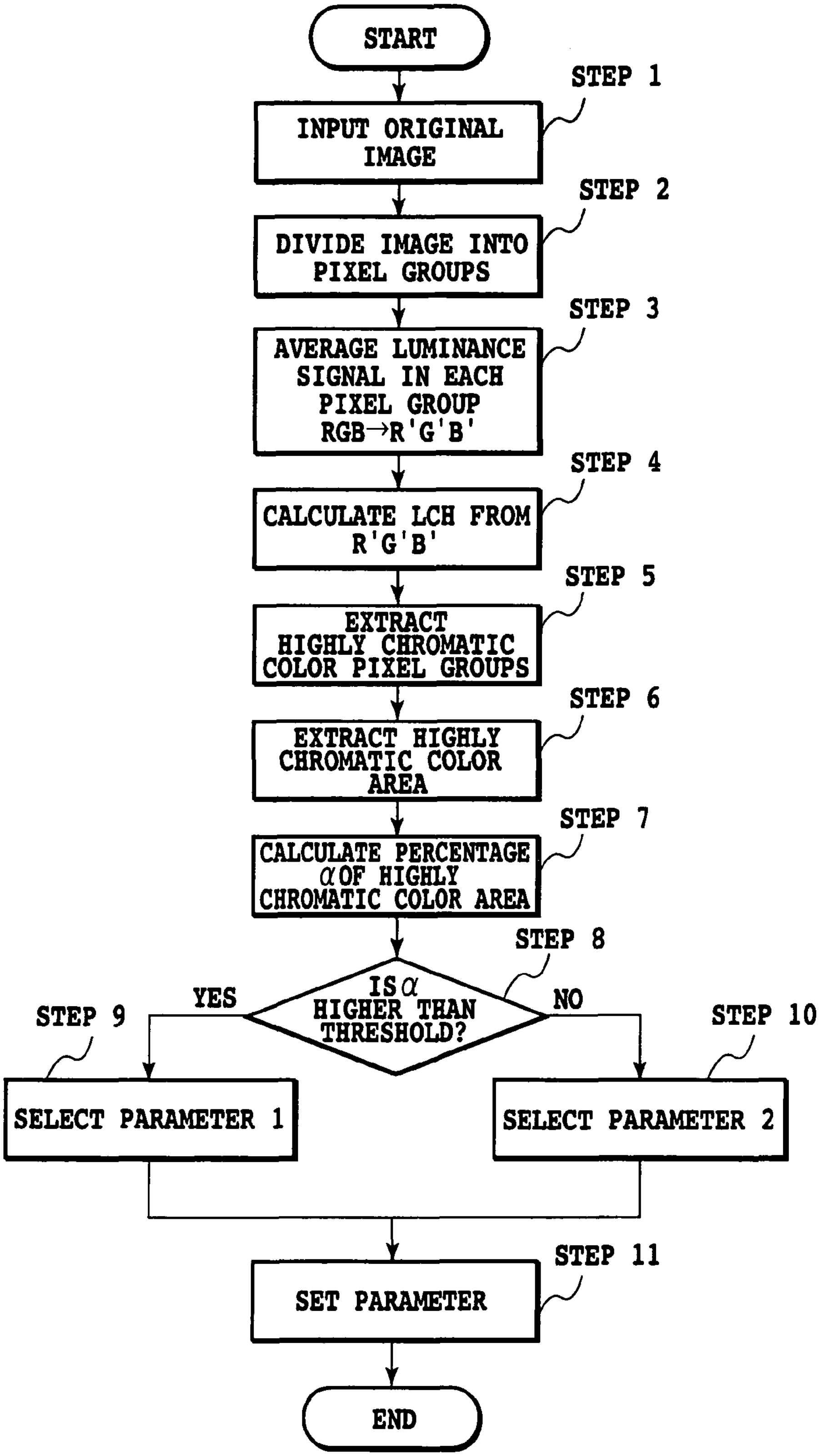
FIG. 4 is a flow chart showing a sequence of steps in an image correction process performed by an image correction unit of FIG. 2.

Next, by referring to the flow chart of FIG. 4, the image correction procedure executed by the image check processing unit 120 will be explained.

First, an original image is input (step 1). Pixels of the original image are each represented by 8-bit data of RGB luminance signals. The original image has a high resolution of, for example, 300 dpi but the human vision system does not recognize such fine dispersions as "areas". Thus, rather than dividing the original image into individual pixel areas, the area dividing processing unit 130 divides the original image into sections each made up of a plurality of pixels, or pixel groups (step 2). Then, the image check processing unit 120 makes the following decision on these pixel groups. It is noted here that the size of the pixel groups is arbitrary and may be changed as required according to the resolution of the original image and the size of a printed output.

Next, the image check processing unit 120 in step 3 averages the luminance signal values for R, G and B pixels in each pixel group and takes the averaged signal values as R', G' and B'. Then, the signal conversion processing unit 131 calculates a Lab, an equalized color space coordinate, from the values of R', G' and B' in each pixel group to determine values of luminance (L), hue (H) and chroma (C) (step 4).

Next, highly chromatic color area detection unit 132 extracts pixel groups (highly chromatic color areas) with higher luminance, chroma and hue than predetermined values (step 5). Colors to be extracted can be determined according to the printer characteristics, such as vivid red, orange and green.

Next, the concentration calculation unit 133, or a concentration level extraction unit, uses known filtering processing to extract areas in which pixel groups of a particular color extracted in step 5 adjoin one another (step 6). As a result, only those areas having highly chromatic pixel groups concentrated are picked up, while areas in which highly chromatic pixel groups are dispersed are not extracted. Further, the concentration calculation unit 133 also calculates a percentage a in the original image of each area covering the concentrated pixel groups extracted in step 6 (step 7).

The decision unit 134 compares the percentage a with a predetermined threshold. Then, if the percentage a is higher than the threshold, the decision unit 134 decides that the color processing parameter 1 be used in that area and, if the percentage $\alpha$ is lower than the threshold, it decides that the color processing parameter 2 be used in the area (step 8, 9, 10). Based on this decision, the parameter setting unit 135 sets the color processing parameter in the print data generation unit 121 (step 11).

Figure 5A:
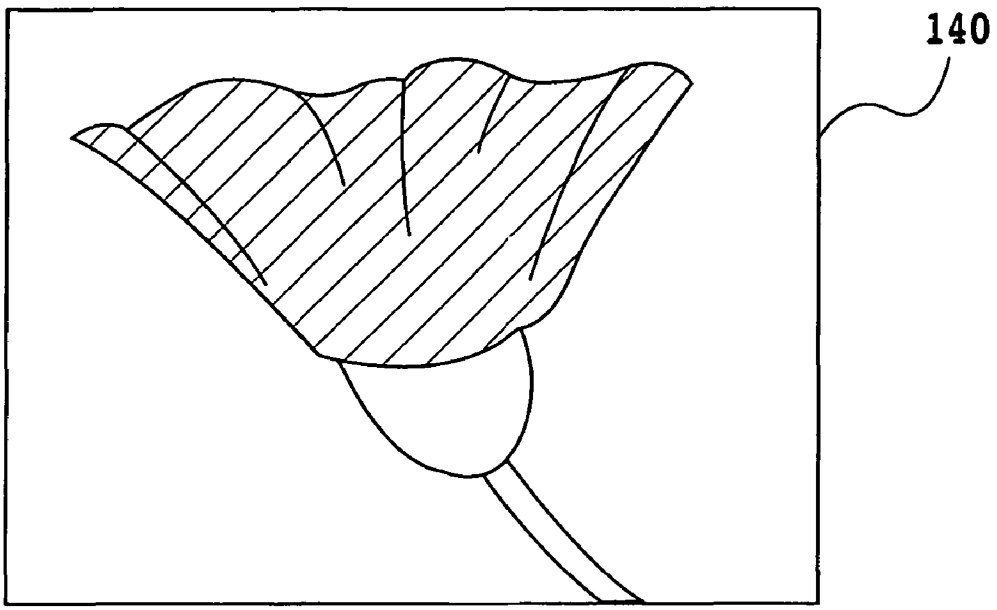
FIG. 5A is an example of an original image, a vivid photographic image of a red flower, to undergo the image correction process in the first embodiment of this invention.
Figure 5B:
FIG. 5B is an example of an original image, a photographic image of red flowers scattered in green grass, to undergo the image correction process in the first embodiment of this invention.

Here, the above image correction processing will be explained for a case where it is executed on the original image 140 of FIG. 5A and for a case where it is executed on the original image 141 of FIG. 5B.

The original image 140 is a picture image of a vivid red flower. In such a picture image, the red flower is better printed out by suppressing the showiness of red color. The original image 141 is a picture image of red flowers similar to that of the original image 140 scattered in green grass. In this picture image, it is preferred that the red flowers be more emphasized.

Figure 6A:
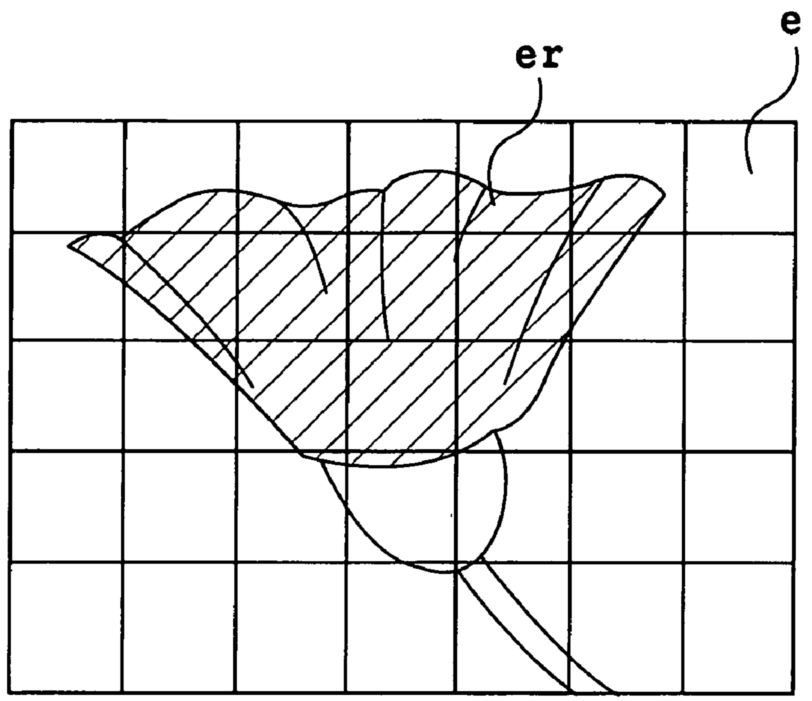
FIG. 6A shows an example of an area dividing process in the first embodiment of this invention, with the original image of FIG. 5A divided into pixel groups.
Figure 6B:
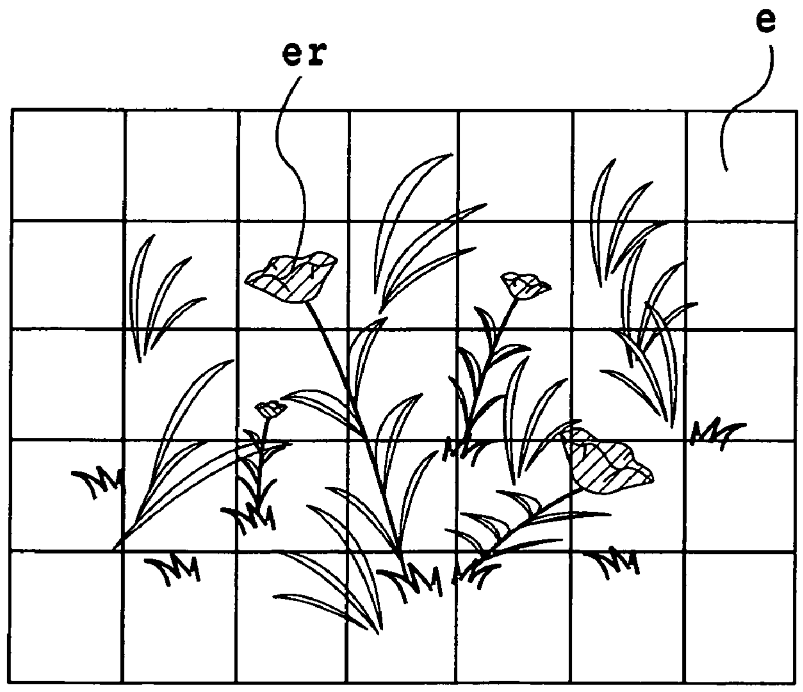
FIG. 6B shows another example of the area dividing process in the first embodiment of this invention, with the original image of FIG. 5B divided into pixel groups.

FIG. 6A and FIG. 6B show the original images 140, 141 divided by the area dividing processing unit 130 into sections each made up of a plurality of pixels, or pixel groups.

Figure 7A:
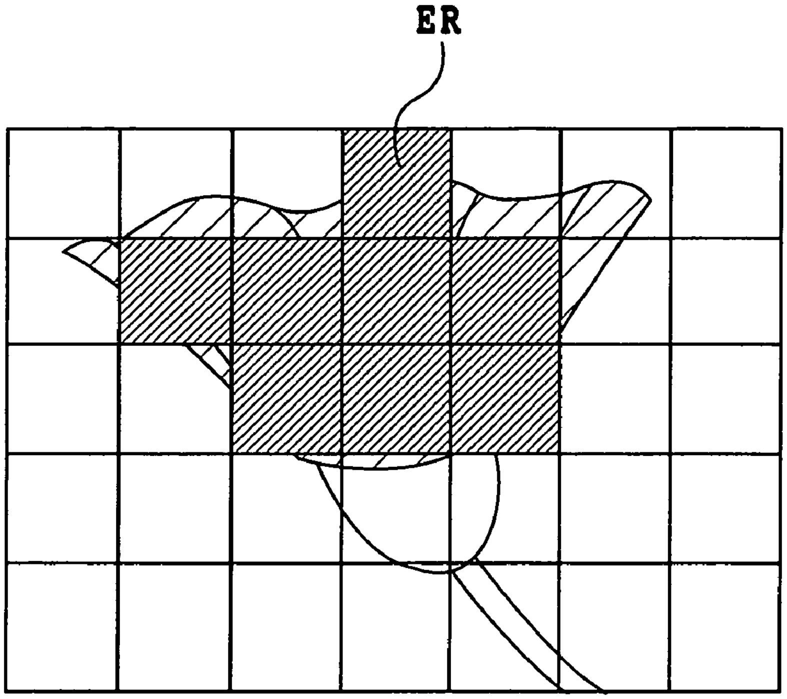
FIG. 7A shows an example of a concentrated area detecting process in the first embodiment of this invention, with areas in which highly chromatic pixel groups are concentrated extracted from the image of FIG. 6A.
Figure 7B:
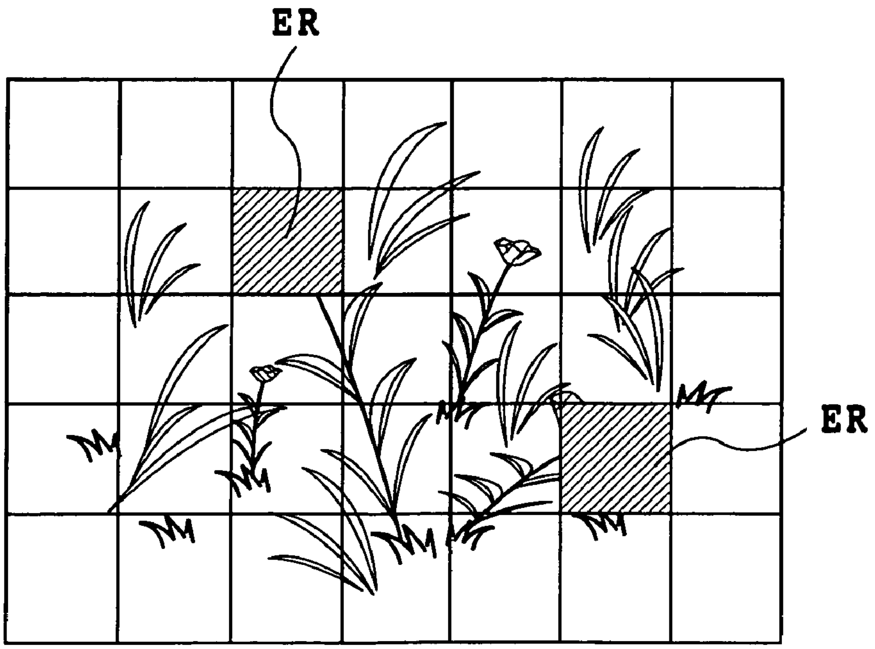
FIG. 7B shows another example of the concentrated area detecting process in the first embodiment of this invention, with areas in which highly chromatic pixel groups are concentrated (concentrated areas) extracted from the image of FIG. 6B.

From among the pixel groups e, into which the image has been divided, those with highly chromatic red er have been extracted and then the concentrated area extraction processing of step 6 is performed. In this processing, the concentrated area ER extracted from the original image 140 is shown shaded in FIG. 7A. This concentrated area is wide. The concentrated areas ER extracted from the original image 141 are small as shown in FIG. 7B. For the original image 140, therefore, the parameter 1 is applied to perform image processing that suppresses the luminance and chroma, namely, minimizes the showiness of the image. On the other hand, for the original image 141, the parameter 2 is applied to perform image processing that enhances the luminance and chroma, i.e., the showiness of the image. This allows either of the images 140, 141 to be printed in a preferable condition.

The image extraction processing in this invention is not limited to the above. Other processing may be adopted as long as it can calculate the concentration level of the area of highly chromatic pixel groups without putting a heavy burden on the processor.

Second Embodiment

Next, the second embodiment of this invention will be described.

In the first embodiment, the method has been described to change a color of a printed output by selecting an appropriate color processing parameter. In the second embodiment, the input image data (RGB luminance signals) representing the original image is corrected according to the concentration level of each area of highly chromatic pixel groups.

Figure 8:
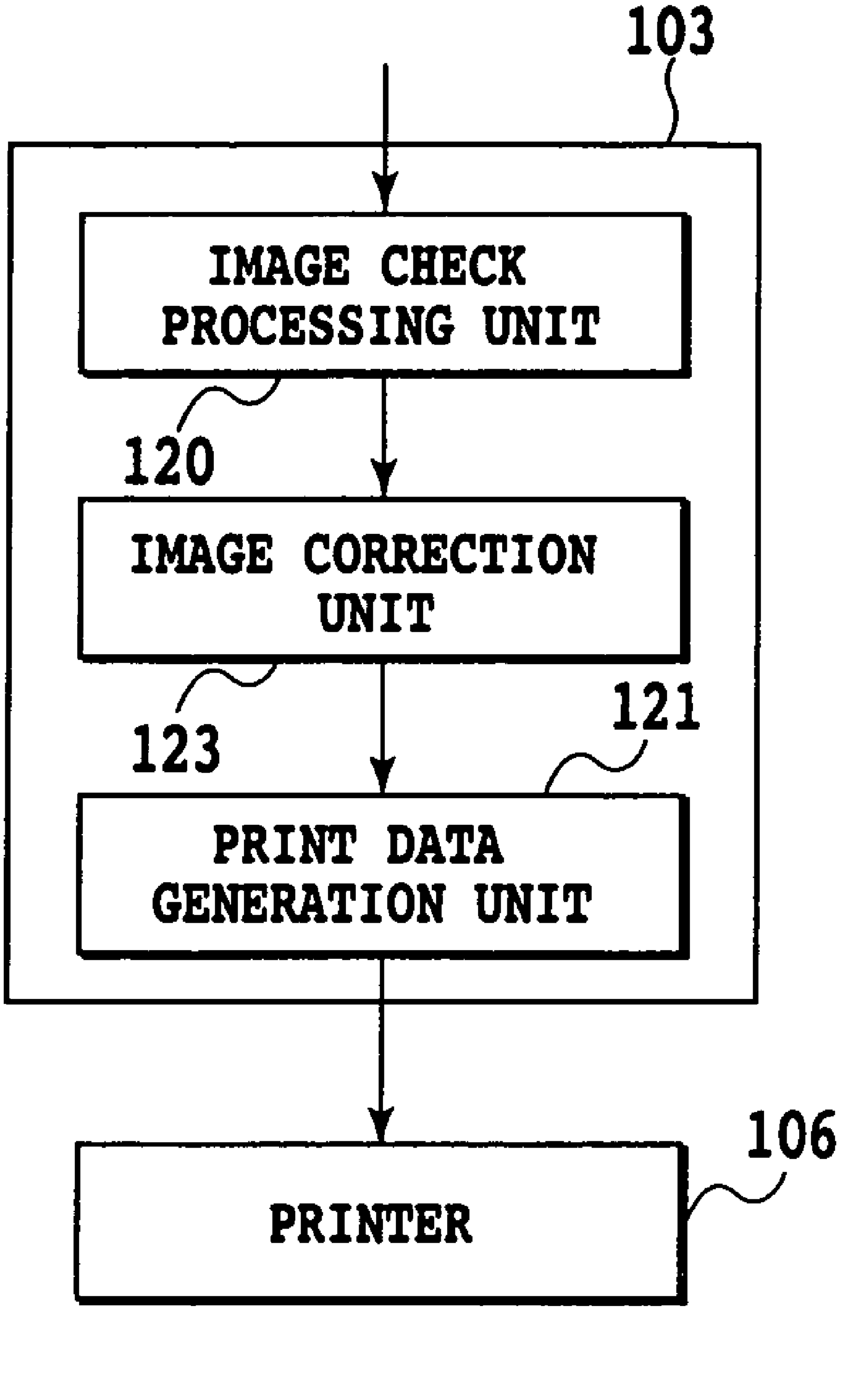
FIG. 8 is a block diagram showing a printer driver configuration in a print system applicable to a second embodiment of this invention.

FIG. 8 shows the processing performed by the printer driver 103 in the second embodiment. The printer driver 103 includes largely an image check processing unit 120, a print data generation unit 121 and an image correction unit 123.

The image check processing unit 120 performs processing in a manner similar to the first embodiment, decides whether or not the image of interest should be output at an enhanced level of showiness, and determines the amount of correction on luminance and chroma. According to the determined correction amount on luminance and chroma, the image correction unit 123 corrects LCH of each pixel in the original image. The image correction processing is, for example, emphasis processing that multiplies the chroma C by $\alpha$. The corrected image is converted by the signal conversion processing from LCH signal into RGB signal. Then, the RGB signal is further transformed by the print data generation unit 121 into printable data for printing by the printer 106.

In the above embodiments, an area in the image in which highly chromatic pixel groups (highly chromatic color areas) are concentrated is extracted and the percentage of the highly chromatic concentrated area with respect to the image as a whole is determined. Based on this percentage, an appropriate image printing parameter specifying one of different levels of emphasis on luminance and chroma can automatically be set.

Thus, a print system can be provided which produces an image conforming to image characteristics, without causing the user any trouble with image processing or mode selection.

In the above embodiments, we have described a case where a printer is used as an output device for producing an image and in which a CMY output image signal that matches the printer is generated. It is noted however that this invention can also be applied to cases where output image signals (RGB signals) conforming to other output devices than the printer, such as displays, are generated.

Other Embodiments

This invention can be applied to a system comprising a plurality of devices (e.g., host computer, interface device, reader, printer, etc.). It can also be applied to equipment comprising a single device (e.g., copying machine and facsimile).

It should be noted that the object of this invention can also be achieved by loading into a system or device a storage medium containing a program code of software that realizes the function of the preceding embodiment, and having a computer (or CPU or MPU) of the system or device read and execute the program code stored in the storage medium. In this case, it is the program code read out from the storage medium that realizes the functions of the preceding embodiments. Thus, the storage medium storing the program code also constitutes this invention. Further, this invention includes not only a case where the functions of the preceding embodiments are realized by the computer executing the read program code but also a case where an operating system (OS) running on the computer executes a part or all of the actual processing according to instructions of the program code to realize the functions of the preceding embodiments.

Further, this invention includes the following processing. That is, the program code read out from the storage medium is written into a memory incorporated in a function expansion card installed in the computer or in a function extension unit connected to the computer and then the CPU mounted on the function expansion card or function extension unit executes a part or all of the actual processing according to the instructions of the program code to realize the functions of the preceding embodiments.

If this invention is applied to the storage medium described above, the storage medium stores the program code corresponding to the flow chart described earlier.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

This application claims priority from Japanese Patent Application No. 2004-297899 filed Oct. 12, 2004, which is hereby incorporated by reference herein.

What is claimed is:

1. An image processing device for outputting an image from image data, comprising:

a determination unit configured to determine a size by which to divide the image data into pixel groups based on a resolution of the image data and a size of a printed output of the image;

a dividing unit configured to divide, according to the determined size, the image data into a plurality of pixel groups, each of the pixel groups comprising a plurality of pixels;

an averaging unit configured to average, for each of the pixel groups, luminance values of the pixels;

a calculation unit configured to calculate, for each group, the chroma value from the averaged luminance values;

a highly chromatic pixel group extraction unit configured to extract, out of the plurality of pixel groups, a plurality of highly chromatic pixel groups, each of whose averaged chroma value is higher than a predetermined value;

a determining unit configured to determine an adjoined pixel group comprising a plurality of the extracted highly chromatic pixel groups of a particular color adjoining each other;

a concentration calculation unit configured to calculate a concentration level for the adjoined pixel group, wherein the concentration level indicates a ratio of the area coverage of the adjoined pixel group to the area coverage of the image;

a parameter setting unit configured to set a chroma parameter for a chroma of the adjoined pixel group such that (a) the chroma is suppressed when the concentration level for the adjoined pixel group is high, and (b) the chroma is emphasized when the concentration level for the adjoined pixel group is low; and a correction unit configured to correct the adjoined pixel group of the image data using the parameter set by the parameter setting unit, to produce a modified image data.

2. The image processing device according to claim 1, wherein the determining unit is configured to determine the adjoined pixel group comprising the plurality of the extracted pixel groups adjoining each other by applying a filter operation.

3. The image processing device according to claim 1, further comprising a printer configured to print the modified image data.

4. The image processing device according to claim 1, wherein a size of the pixel group is determined based on a size of the printed modified image.

5. The image processing device according to claim 1, wherein the determining unit is configured to determine the adjoined pixel group comprising the plurality of the extracted pixel groups adjoining each other based on the averaged chroma values.

6. The image processing device according to claim 1, wherein the adjoining unit is configured to determine the adjoined pixel group comprising the plurality of the extracted pixel groups adjoining each other based on having a same averaged chroma value.

7. An image processing method for outputting an image from image data, the method comprising the steps of:

determining a size by which to divide the image data into pixel groups based on a resolution of the image data and a size of a printed output of the image;

dividing, according to the determined size, the image data into a plurality of pixel groups, each of the pixel groups comprising a plurality of pixels;

averaging, for each of the pixel groups, luminance values of the pixels;

calculating, for each group, the chroma value from the averaged luminance values;

extracting, out of the plurality of pixel groups, a plurality of highly chromatic pixel groups, each of whose averaged chroma value is higher than a predetermined value;

determining an adjoined pixel group comprising a plurality of the extracted highly chromatic pixel groups of a particular color adjoining each other;

calculating a concentration level for the adjoined pixel group, wherein the concentration level indicates a ratio of the area coverage of the adjoined pixel group to the area coverage of the image;

setting a parameter for a chroma of the adjoined pixel group such that (a) the chroma is suppressed when the concentration level for the adjoined pixel group is high, and (b) the chroma is emphasized when the concentration level for the adjoined pixel group is low; and correcting the adjoined pixel group of the image data using the parameter set in the setting step, to produce a modified image data.

* * * * *